United States Patent
Kuster et al.

(10) Patent No.: US 10,301,868 B2
(45) Date of Patent: May 28, 2019

(54) INSULATED GLAZING COMPRISING A SPACER, AND PRODUCTION METHOD

(71) Applicant: SAINT-GOBAIN GLASS FRANCE, Courbevoie (FR)

(72) Inventors: Hans-Werner Kuster, Aachen (DE); Rolf Koette, Alsdorf (DE); Walter Schreiber, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/321,170

(22) PCT Filed: Jun. 19, 2015

(86) PCT No.: PCT/EP2015/063821
§ 371 (c)(1),
(2) Date: Dec. 21, 2016

(87) PCT Pub. No.: WO2015/197491
PCT Pub. Date: Dec. 30, 2015

(65) Prior Publication Data
US 2017/0152701 A1    Jun. 1, 2017

(30) Foreign Application Priority Data
Jun. 27, 2014    (EP) .................................... 14174733

(51) Int. Cl.
*E06B 3/663*    (2006.01)
*E06B 3/673*    (2006.01)
(Continued)

(52) U.S. Cl.
CPC ............ *E06B 3/66366* (2013.01); *B32B 3/08* (2013.01); *B32B 7/14* (2013.01);
(Continued)

(58) Field of Classification Search
CPC ............. E06B 3/66366; E06B 3/66328; E06B 3/67304; E06B 3/6733; E06B 3/67339;
(Continued)

(56) References Cited

U.S. PATENT DOCUMENTS 2,094,381 A    9/1937    Slayter
2,303,897 A    12/1942   Smith
(Continued)

FOREIGN PATENT DOCUMENTS

CA    2275448 A1    7/1998
CA    2 855 278 A1    7/2013
(Continued)

OTHER PUBLICATIONS

International Search Report for International Application No. PCT/EP2015/063821 filed on Jun. 19, 2015 in the name of Saint-Gobain Glass France. (English translation and German original) dated Aug. 19, 2015.

(Continued)

*Primary Examiner* — Donald J Loney
(74) *Attorney, Agent, or Firm* — Steinfl + Bruno LLP

(57) ABSTRACT

An insulating glazing unit having a first pane, a second pane, a third pane arranged between the first pane and the second pane, an outer pane interspace, an inner pane interspace, and a spacer is described. The spacer having a plastic profile with a first glazing interior surface and a second glazing interior surface, a first pane contact surface, a second pane contact surface, a primary sealing means, and a main member containing a sealing material and a drying material. The plastic profile includes a groove, into which the third pane is inserted and which runs parallel to the first pane contact surface and to the second pane contact surface. The plastic profile separates the outer pane interspace from the inner pane interspace. The main member is arranged in the outer (Continued)

Figure 1A:
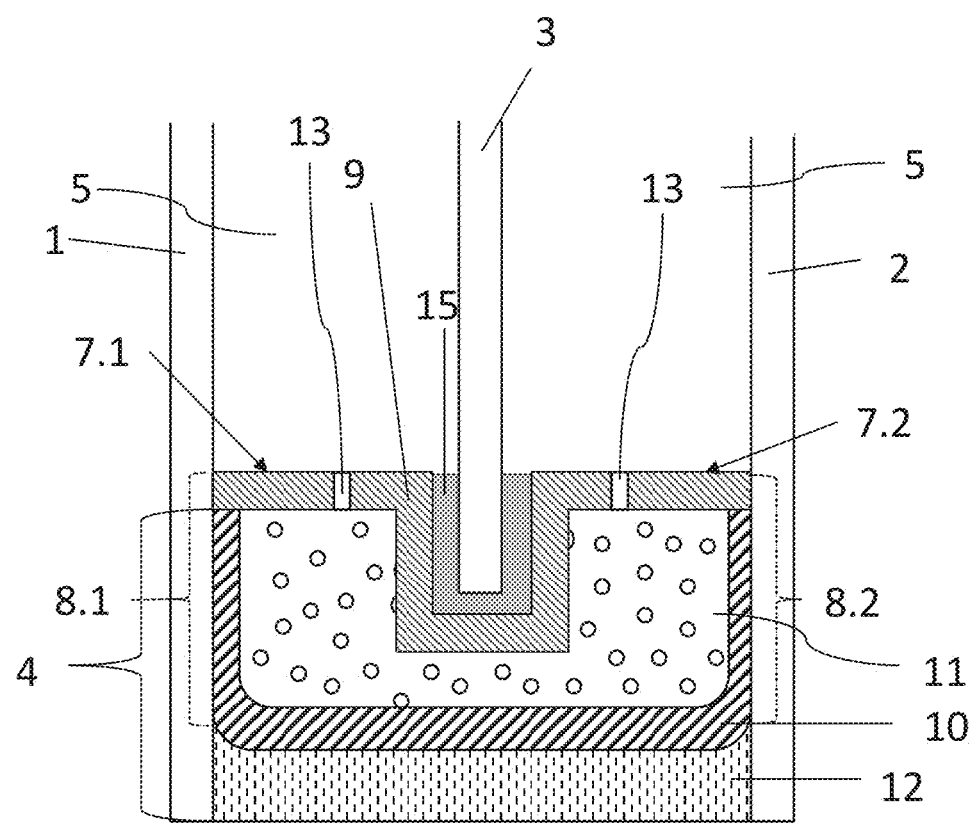

pane interspace between the plastic profile and the primary sealing means, the main member being adjacent the plastic profile and the primary sealing means.

21 Claims, 4 Drawing Sheets

(51) Int. Cl.
  *B32B 3/08* (2006.01)
  *B32B 7/14* (2006.01)
  *B32B 17/10* (2006.01)
  *E06B 3/67* (2006.01)

(52) U.S. Cl.
  CPC .... *B32B 17/10055* (2013.01); *B32B 17/1077* (2013.01); *B32B 17/10302* (2013.01); *E06B 3/66328* (2013.01); *E06B 3/6733* (2013.01); *E06B 3/67304* (2013.01); *E06B 3/67326* (2013.01); *E06B 3/67339* (2013.01); *B32B 2250/03* (2013.01); *B32B 2307/724* (2013.01); *B32B 2419/00* (2013.01); *E06B 3/6707* (2013.01); *E06B 3/6715* (2013.01); *E06B 3/67347* (2013.01); *E06B 2003/66385* (2013.01); *E06B 2003/66395* (2013.01); *Y02B 80/22* (2013.01); *Y02B 80/24* (2013.01)

(58) Field of Classification Search
  CPC ... E06B 3/6707; E06B 3/37347; Y02B 80/22; Y02B 80/24; B32B 17/10055
  See application file for complete search history.

(56) References Cited

U.S. PATENT DOCUMENTS

| | | | |
|---|---|---|---|
| 2,834,999 A | 5/1958 | Taylor et al. | |
| 3,168,089 A | 2/1965 | Larkin | |
| 3,793,276 A | 2/1974 | Blunt et al. | |
| 3,935,683 A | 2/1976 | Derner et al. | |
| 3,998,680 A | 12/1976 | Flint | |
| 4,080,482 A | 3/1978 | Lacombe | |
| 4,109,431 A | 8/1978 | Mazzoni et al. | |
| 4,198,254 A | 4/1980 | Laroche et al. | |
| 4,226,063 A | 10/1980 | Chenel | |
| 4,479,988 A | 10/1984 | Dawson | |
| 4,613,530 A | 9/1986 | Hood et al. | |
| 4,658,552 A | 4/1987 | Mulford | |
| 4,658,553 A | 4/1987 | Shinagawa | |
| 4,799,745 A | 1/1989 | Meyer et al. | |
| 4,831,799 A | 5/1989 | Glover et al. | |
| 5,007,217 A | 4/1991 | Glover et al. | |
| 5,071,206 A | 12/1991 | Hood et al. | |
| 5,079,054 A | 1/1992 | Davies et al. | |
| 5,125,195 A | 6/1992 | Brede | |
| 5,173,800 A | 12/1992 | King | |
| 5,209,034 A | 5/1993 | Box | |
| 5,270,092 A | 12/1993 | Griffith et al. | |
| 5,290,611 A | 3/1994 | Taylor | |
| 5,302,425 A | 4/1994 | Taylor | |
| 5,313,762 A | 5/1994 | Guillemet | |
| 5,424,111 A | 6/1995 | Farbstein | |
| 5,439,716 A | 8/1995 | Larsen | |
| 5,460,862 A | 10/1995 | Roller | |
| 5,512,341 A | 4/1996 | Newby et al. | |
| 5,655,282 A | 8/1997 | Hodek et al. | |
| 5,679,419 A | 10/1997 | Larsen | |
| 5,759,665 A | 6/1998 | Lafond | |
| 5,762,257 A | 6/1998 | Garrecht | |
| 5,773,135 A | 6/1998 | Lafond | |
| 5,851,627 A | 12/1998 | Farbstein | |
| 5,962,090 A | 10/1999 | Trautz | |
| 6,001,453 A | 12/1999 | Lafond | |
| 6,002,521 A * | 12/1999 | Town | E06B 3/6604 359/1 |
| 6,060,178 A | 5/2000 | Krisko | |
| 6,061,994 A | 5/2000 | Goer et al. | |
| 6,115,989 A | 9/2000 | Boone et al. | |
| 6,223,414 B1 | 5/2001 | Hodek et al. | |
| 6,250,045 B1 | 6/2001 | Goer et al. | |
| 6,250,245 B1 | 6/2001 | Robinson et al. | |
| 6,266,940 B1 | 7/2001 | Reichert | |
| 6,339,909 B1 | 1/2002 | Brunnhofer et al. | |
| 6,351,923 B1 | 3/2002 | Peterson | |
| 6,389,779 B1 | 5/2002 | Brunnhofer | |
| 6,391,400 B1 | 5/2002 | Russell et al. | |
| 6,457,294 B1 | 10/2002 | Virnelson et al. | |
| 6,503,617 B2 | 1/2003 | Jacobsen et al. | |
| 6,528,131 B1 | 3/2003 | Lafond | |
| 6,537,629 B1 | 3/2003 | Ensinger | |
| 6,613,404 B2 | 9/2003 | Johnson | |
| 6,796,102 B2 | 9/2004 | Virnelson et al. | |
| 6,989,188 B2 | 1/2006 | Brunnhofer et al. | |
| 7,317,280 B2 | 1/2008 | Qiu et al. | |
| 7,827,760 B2 | 11/2010 | Brunnhofer et al. | |
| 7,858,193 B2 | 12/2010 | Ihlo et al. | |
| 7,997,037 B2 | 8/2011 | Crandell et al. | |
| 8,453,415 B2 | 6/2013 | Brunnhofer et al. | |
| 8,484,912 B2 | 7/2013 | Engelmeyer | |
| 8,640,406 B2 | 2/2014 | Brunnhofer et al. | |
| 8,701,363 B2 | 4/2014 | Schield | |
| 9,085,708 B2 | 7/2015 | Becker et al. | |
| 9,260,906 B2 | 2/2016 | Schreiber | |
| 9,487,994 B2 | 11/2016 | Lenz et al. | |
| 10,167,665 B2 | 1/2019 | Kuster et al. | |
| 2001/0001357 A1 | 5/2001 | Reichert | |
| 2002/0018891 A1 | 2/2002 | Jacobsen et al. | |
| 2002/0192473 A1 | 12/2002 | Gentilhomme et al. | |
| 2002/0194813 A1 | 12/2002 | Virnelson et al. | |
| 2003/0074859 A1 | 4/2003 | Reichert et al. | |
| 2004/0028953 A1 | 2/2004 | Kraemling | |
| 2004/0076815 A1 | 4/2004 | Reichert | |
| 2004/0163347 A1 | 8/2004 | Hodek et al. | |
| 2004/0256978 A1 | 12/2004 | Yu et al. | |
| 2005/0034386 A1 | 2/2005 | Crandell | |
| 2005/0100691 A1 | 5/2005 | Bunnhofer et al. | |
| 2005/0170161 A1 | 8/2005 | Ramchandra et al. | |
| 2005/0214487 A1 | 9/2005 | Trautz | |
| 2005/0217718 A1 | 10/2005 | Dings et al. | |
| 2005/0287370 A1 | 12/2005 | Kaczmarek et al. | |
| 2006/0003138 A1 | 1/2006 | Kaczmarek et al. | |
| 2006/0130427 A1 | 6/2006 | Hodek et al. | |
| 2006/0150577 A1 | 7/2006 | Hodek et al. | |
| 2006/0162281 A1 | 7/2006 | Pettit et al. | |
| 2006/0260227 A1 | 11/2006 | Winfield | |
| 2007/0087140 A1 | 4/2007 | Dierks | |
| 2007/0122572 A1 | 5/2007 | Shibuya et al. | |
| 2007/0251180 A1 | 11/2007 | Gosling et al. | |
| 2007/0261358 A1 | 11/2007 | Davis et al. | |
| 2007/0261795 A1 | 11/2007 | Rosskamp | |
| 2008/0053037 A1 | 3/2008 | Gallagher | |
| 2008/0134596 A1 | 6/2008 | Brunnhofer et al. | |
| 2009/0120019 A1 | 5/2009 | Trpkovski | |
| 2009/0120035 A1 | 5/2009 | Trpkovski | |
| 2009/0139165 A1 | 6/2009 | Prete et al. | |
| 2009/0186213 A1 | 7/2009 | Ihlo et al. | |
| 2009/0197077 A1 | 8/2009 | Reutler et al. | |
| 2009/0243802 A1 | 10/2009 | Wolf et al. | |
| 2009/0301637 A1 | 12/2009 | Reichert | |
| 2010/0011703 A1 | 1/2010 | Seele et al. | |
| 2010/0107529 A1 | 5/2010 | Engelmeyer | |
| 2011/0041427 A1 | 2/2011 | Bouesnard | |
| 2011/0275796 A1 | 11/2011 | Seilz et al. | |
| 2012/0132251 A1 | 5/2012 | Sedlacek et al. | |
| 2012/0141699 A1 * | 6/2012 | Mader | E06B 3/66366 428/34 |
| 2012/0192946 A1 | 8/2012 | Becker et al. | |
| 2012/0297707 A1 | 11/2012 | Lenz et al. | |
| 2012/0297708 A1 | 11/2012 | Brunnhofer et al. | |
| 2013/0079446 A1 | 3/2013 | Becker et al. | |
| 2014/0138425 A1 | 5/2014 | Meyer et al. | |
| 2014/0272207 A1 | 9/2014 | McKenna et al. | |
| 2014/0311065 A1 | 10/2014 | Schreiber | |
| 2014/0356557 A1 | 12/2014 | Reichert | |

(56) References Cited

U.S. PATENT DOCUMENTS

| | | |
|---|---|---|
| 2015/0107167 A1 | 4/2015 | Baumann et al. |
| 2016/0069123 A1 | 3/2016 | Schreiber |
| 2016/0138326 A1 | 5/2016 | Kuster et al. |
| 2016/0201381 A1 | 7/2016 | Kuster et al. |
| 2016/0290032 A1 | 10/2016 | Kuster et al. |
| 2016/0290033 A1 | 10/2016 | Messere |
| 2017/0145734 A1 | 5/2017 | Kuster et al. |
| 2017/0298680 A1 | 10/2017 | Schreiber et al. |
| 2018/0058139 A1 | 3/2018 | Schwerdt et al. |

FOREIGN PATENT DOCUMENTS

| | | |
|---|---|---|
| CN | 1377329 A | 10/2002 |
| CN | 1678810 A | 10/2005 |
| DE | 2555384 C3 | 3/1982 |
| DE | 3302659 A1 | 8/1984 |
| DE | 2752542 C2 | 10/1989 |
| DE | 40 32 192 A1 | 6/1991 |
| DE | 4024697 A1 | 2/1992 |
| DE | 9408764 U1 | 10/1995 |
| DE | 44 32 402 A1 | 3/1996 |
| DE | 19533685 A1 | 3/1997 |
| DE | 19602455 A1 | 7/1997 |
| DE | 19625845 A1 | 1/1998 |
| DE | 19805348 A1 | 8/1999 |
| DE | 19807454 A1 | 8/1999 |
| DE | 198 29 151 C1 | 2/2000 |
| DE | 69607473 T2 | 9/2000 |
| DE | 19927683 C1 | 1/2001 |
| DE | 10025321 A1 | 1/2002 |
| DE | 10356216 A1 | 7/2005 |
| DE | 102009006 062 A1 | 7/2010 |
| DE | 10 2009 057 156 A1 | 6/2011 |
| DE | 102010006127 A1 | 8/2011 |
| DE | 202012104026 U1 | 10/2013 |
| DE | 69633132 T2 | 8/2015 |
| EP | 0 078 530 A2 | 5/1983 |
| EP | 0154428 A2 | 9/1985 |
| EP | 0261923 A2 | 3/1988 |
| EP | 0430889 A2 | 6/1991 |
| EP | 0 612 119 A1 | 8/1994 |
| EP | 0852280 A1 | 7/1998 |
| EP | 0865560 B1 | 8/2004 |
| EP | 1607216 A1 | 12/2005 |
| EP | 1607217 A1 | 12/2005 |
| EP | 0912455 B1 | 5/2006 |
| EP | 1892365 A1 | 2/2008 |
| EP | 1218307 B1 | 7/2008 |
| EP | 1917222 B1 | 3/2009 |
| EP | 2218862 A2 | 8/2010 |
| EP | 2 270 307 A2 | 1/2011 |
| EP | 2 359 973 A2 | 8/2011 |
| EP | 2363565 A2 | 9/2011 |
| EP | 2420536 A1 | 2/2012 |
| EP | 2 584 135 A2 | 4/2013 |
| EP | 2628884 A2 | 8/2013 |
| EP | 2802726 B1 | 4/2016 |
| FR | 2205620 A1 | 5/1974 |
| FR | 2 799 005 A1 | 3/2001 |
| GB | 1 203 999 A | 9/1970 |
| GB | 2103999 A | 3/1982 |
| GB | 2210899 A | 6/1989 |
| JP | H09175843 A | 7/1997 |
| JP | H11189439 A | 7/1999 |
| JP | 2002-504639 A | 2/2002 |
| JP | 2008019131 A | 1/2008 |
| WO | 97/48649 A1 | 12/1997 |
| WO | 98/28513 A1 | 7/1998 |
| WO | 99/41481 A1 | 8/1999 |
| WO | 01/16046 A1 | 3/2001 |
| WO | 2004/005783 A2 | 1/2004 |
| WO | 2007/042688 A1 | 4/2007 |
| WO | 2007/101964 A1 | 9/2007 |
| WO | 2008022877 A1 | 2/2008 |
| WO | 2010034781 A2 | 4/2010 |
| WO | 2010/115456 A1 | 10/2010 |
| WO | 2011088994 A2 | 7/2011 |
| WO | 2012/095266 A1 | 7/2012 |
| WO | 2012140005 A1 | 10/2012 |
| WO | 2013104507 A1 | 7/2013 |
| WO | 2014/198429 A1 | 12/2014 |
| WO | 2014/198431 A1 | 12/2014 |

OTHER PUBLICATIONS

Annex CC1 to opposition by opponent Camvac Limited. "Thermobar production sheets from Thermoseal Group Ltd of Aug. 8, 2011 and Sep. 26, 2011". Aug. 8, 2011 and Sep. 26, 2011. 2 pages.

Annex CC2 to opposition by opponent Camvac Limited. "Stock Control from Thermoseal Group Ltd of Jul. 29, 2011 and Sep. 6, 2011". Jul. 29, 2011 and Sep. 6, 2011. 1 page.

Annex CC3 to opposition by opponent Camvac Limited. "Invoice No. 47340 from Lohmann of Jul. 29, 2011". Jul. 29, 2011. 1 page.

Annex D1 to opposition by opponent Camvac Limited. "Preliminary Data Sheet—Duplocoll 40024". No date. 1 page.

Annex E to opposition by opponent Camvac Limited. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". May 24, 2011, Jun. 8, 2011, Jun. 29, 2011, Jul. 22, 2011, and Aug. 18, 2011. 5 pages.

Annex F1 to opposition by opponent Camvac Limited. "Data Sheet 12/12 Cambrite film from Camvac". No date. 2 pages.

Annex F1A to opposition by opponent Camvac Limited. "Screen shot of Data Sheet 12/12 Cambrite film from Camvac". Jan. 19, 2017. 1 page.

Annex F1B to opposition by opponent Camvac Limited. "Declaration of Mr Gary Chalkley (Camvac Product Development Director)". Jan. 24, 2017. 1 page.

Annex F2 to opposition by opponent Camvac Limited. "Declaration of Mr. James Shipman (Camvac Process Development Manager)". Jan. 24, 2017. 2 pages.

Annex G to opposition by opponent Camvac Limited. "Data sheet PSI values for windows having a Thermobar Warm Edge Spacer". Nov. 2014. 1 page.

Opposition by opponent Ensinger GmbH in European Patent 2,802,726 B1, issued Apr. 27, 2016 to Saint-Gobain Glass France. Mail date: Jan. 27, 2017. 44 pages. (English Translation + German Original).

Annex D1A to opposition by opponent Ensinger GmbH. "Affidavit of Mr. Marc Rehling". Jan. 24, 2017. 4 pages. (English Translation + German Original).

Annex D1B to opposition by opponent Ensinger GmbH. "Photography of "Thermobar" Spacer". No date. 1 page.

Annex D1C to opposition by opponent Ensinger GmbH "Test Report AP 16-11-98". Nov. 2016. 8 pages. (German Original Only).

Annex D1D to opposition by opponent Ensinger GmbH. "Figure 5 of D1C with annotations". 13 pages. No date. (English Translation + German Original).

Annex D1E to opposition by opponent Ensinger GmbH. "ATR-Infrared Spectroscopy Measurement of the "Thermobar" Spacer". Dec. 12, 2016. 2 pages. (English Translation + German Original).

Annex C3 to opposition by opponent Thermoseal Group Ltd. "Invoices No. 47197, 47486 and 47812 from Lohmann of Jun. 30, 2011, Aug. 26, 2011 and Oct. 31, 2011". Jun. 30, 2011, Aug. 26, 2011, Oct. 31, 2011. 3 pages.

Annex CC1 to opposition by opponent Thermoseal Group Ltd. "Thermobar production sheets from Thermoseal Group Ltd of Aug. 8, 2011 and Sep. 26, 2011". Aug. 8, 2011 and Sep. 26, 2011. 2 pages.

Annex CC2 to opposition by opponent Thermoseal Group Ltd. "Stock Control from Thermoseal Group Ltd of Jul. 29, 2011 and Sep. 6, 2011". Jul. 29, 2011 and Sep. 6, 2011. 1 page.

Annex CC3 to opposition by opponent Thermoseal Group Ltd. "Invoice No. 47340 from Lohmann of Jul. 29, 2011". Jul. 29, 2011. 1 page.

Annex D1 to opposition by opponent Thermoseal Group Ltd. "Preliminary Data Sheet—Duplocoll 40024".No date. 1 page.

Annex D2 to opposition by opponent Thermoseal Group Ltd. "Declaration of Ms Amanda Smith (Lohmann Segment Manager)". Jan. 18, 2014. 1 page.

(56) References Cited

OTHER PUBLICATIONS

Annex E to opposition by opponent Thermoseal Group Ltd. "Delivery Notes with purchase order Nos. 7621, 7684, 7756, 7757 and 7832 from Camvac Limited of May 24, 2011, June 8 and 29, 2011, Jul. 22, 2011 and Aug. 18, 2011". Jul. 22, 2011 and Aug. 18, 2011. 6 pages.
Annex F1 to opposition by opponent Thermoseal Group Ltd. "Data Sheet of 12/12 Cambrite film from Camvac".No date. 2 pages.
Annex F1A to opposition by opponent Thermoseal Group Ltd. "Screen shot showing the last date that the 12/12 Cambrite film from Camvac data sheet was modified". Jan. 19, 2017. 1 page.
Annex F2 to opposition by opponent Thermoseal Group Ltd. "Declaration of Mr James Shipman (Camvac Process Development Manager)". Jan. 24, 2017. 2 pages.
Annex G to opposition by opponent Thermoseal Group Ltd. "Data sheet PSI values for windows having a Thermobar Warm Edge Spacer". Nov. 2014. 1 page.
Annex D1C to opposition by opponent Ensinger GmbH (Jan. 27, 2017) in European Patent 2,802,726 B1 (issued to Saint-Gobain Glass France). "Test Report, Light micrographs of two existing polished sections with the designation 2010 and 2011", Institute of Polymertechnology, Nov. 2016, 16 pages (English Translation + German Original).
Annex A7 to opposition by opponent Helima GmbH (Jan. 27, 2017) in European Patent 2,802,726 B1 (issued to Saint-Gobain Glass France). Hestermann and Rongen, "Frick/Kndöll Baukonstruktionslehre 2", pp. 371-372, 1996-2013, 10 pages (English Translation + German Original).
Advisory Action issued for U.S. Appl. No. 14/942,902, filed Nov. 16, 2015 in the name of Saint-Gobain Glass France, dated Jan. 5, 2017. 4 pages.
Amcor "Ceramis Coating Technology" Oct. 2012. 12 pages.
Final Office Action issued for U.S. Appl. No. 14/357,164, filed May 8, 2014 in the name of Saint-Gobain Glass France, dated Feb. 9, 2015. 16 pages.
Final Office Action issued for U.S. Appl. No. 14/942,902, filed Nov. 16, 2015 in the name of Saint-Gobain Glass France, dated Sep. 26, 2016. 33 pages.
Final Office Action issued for U.S. Appl. No. 14/942,902, filed Nov. 16, 2015 in the name of Saint-Gobain Glass France, dated Sep. 12, 2017. 29 pages.
Final Office Action issued for U.S. Appl. No. 14/909,073, filed Jan. 29, 2016 in the name of Saint-Gobain Glass France, dated Jun. 20, 2017. 25 pages.
International Preliminary Report on Patentability dated Jul. 15, 2014 for International Application No. PCT/EP2012/076341 filed on Dec. 20, 2012 in the name of Saint-Gobain Glass France (English Translation and German Original). 17 pages.
International Search Report for International Application No. PCT/EP2012/076341 filed on Dec. 20, 2012 in the name of Saint-Gobain Glass France, dated Feb. 8, 2013 (English Translation and German Original). 7 pages.
International Search Report for PCT Application No. PCT/EP2014/067901 filed Aug. 22, 2014 on behalf of Saint-Gobain Glass France, dated Oct. 7, 2014 (German original and English translation). 5 pages.
International Search Report for International Application No. PCT/EP2015/063814 filed on Jun. 19, 2015 in the name of Saint-Gobain Glass France, dated Aug. 14, 2015. 5 pages (English Translation and German Original).
International Search Report for International Application No. PCT/EP2014/076736 filed on Dec. 5, 2014 in the name of Saint-Gobain Glass France, dated Mar. 10, 2016. 5 pages (English Translation and German Original).
International Search Report for International Application No. PCT/EP2014/076739 filed on Dec. 5, 2014 in the name of Saint-Gobain Glass France, dated Feb. 3, 2015. 7 pages (English Translation and German Original).

International Search Report for PCT/EP2016/054226 filed on Feb. 29, 2016 in the name of Saint-Gobain Glass France, dated May 3, 2016. 5 pages. (German & English).
Non-Final Office Action issued for U.S. Appl. No. 14/357,164, filed May 8, 2014 in the name of Saint-Gobain Glass France, dated Sep. 10, 2014. 24 pages.
Non-Final Office Action issued for U.S. Appl. No. 14/357,164, filed May 8, 2014 in the name of Saint-Gobain Glass France, dated Aug. 10, 2015. 14 pages.
Non-Final Office Action issued for U.S. Appl. No. 14/942,902, filed Nov. 16, 2015 in the name of Saint-Gobain Glass France, dated Mar. 10, 2016. 28 pages.
Non-Final Office Action issued for U.S. Appl. No. 14/942,902, filed Nov. 16, 2015 in the name of Saint-Gobain Glass France, dated Apr. 4, 2017. 23 pages.
Non-Final Office Action issued for U.S. Appl. No. 14/909,073, filed Jan. 29, 2016 in the name of Saint-Gobain Glass France, dated Apr. 4, 2017. 23 pages.
Non-Final Office Action issued for U.S. Appl. No. 14/909,073, filed Jan. 29, 2016 in the name of Saint-Gobain Glass France, dated Aug. 25, 2017. 35 pages.
Notice of Allowance issued for U.S. Appl. No. 14/357,164, filed May 8, 2014 in the name of Saint-Gobain Glass France, dated May 18, 2015. 12 pages.
Notice of Allowance issued for U.S. Appl. No. 14/357,164, filed May 8, 2014 in the name of Saint-Gobain Glass France, dated Jun. 22, 2015. 8 pages.
Notice of Allowance issued for U.S. Appl. No. 14/357,164, filed May 8, 2014 in the name of Saint-Gobain Glass France, dated Sep. 28, 2015. 12 pages.
Notice of Allowance issued for U.S. Appl. No. 14/357,164, filed May 8, 2014 in the name of Saint-Gobain Glass France, dated Nov. 23, 2015. 14 pages.
Written Opinion issued for International Application No. PCT/EP2015/063814 filed on Jun. 19, 2015 in the name of Saint-Gobain Glass France, dated Aug. 14, 2015. 16 pages (German Original and English Translation).
Written Opinion issued for International Application No. PCT/EP2015/063821 filed on Jun. 19, 2015 in the name of Saint-Gobain Glass France, dated Aug. 19, 2015. 16 pages (English Translation and German Original).
Written Opinion mailed for International Application No. PCT/EP2012/076341 filed on Dec. 20, 2012 in the name of Saint-Gobain Glass France, dated Feb. 8, 2013. (English Translation and German Original). 15 pages.
Written Opinion for International Application No. PCT/EP2014/067901 filed Aug. 22, 2014 on behalf of Saint-Gobain Glass France, dated Oct. 7, 2014. (German original + English Translation) 13 pages.
Opposition by opponent Camvac Limited in European Patent 2,802,726 B1, issued Apr. 27, 2016 to Saint-Gobain Glass France. Mail date: Jan. 27, 2017. 16 pages.
Annex A to opposition by opponent Camvac Limited. "Press notes and articles from 2011". May-Aug. 2011. 4 pages.
Annex B to opposition by opponent Camvac Limited. "Invoices and delivery notes from Thermoseal Group Ltd from Aug. 2011 to Dec. 2011". Aug.-Dec. 2011. 24 pages.
Annex BB to opposition by opponent Camvac Limited. "Invoice and delivery note from Thermoseal Group Ltd of Aug. 2011". Aug. 2011. 2 pages.
Annex C1 to opposition by opponent Camvac Limited. "Thermobar production sheets from Thermoseal Group Ltd of Dec. 22, 2011 and Dec. 23, 2011". Dec. 22 and 23, 2011. 2 pages.
Annex C2 to opposition by opponent Camvac Limited. "Stock Control from Thermoseal Group Ltd from Jun. 8, 2011 to Dec. 22, 2011". Jun. 8, 2011-Dec. 22, 2011. 14 pages.
Annex C3 to opposition by opponent Camvac Limited. "Invoices No. 47197, 47486 and 47812 from Lohmann of Jun. 30, 2011, Aug. 26, 2011 and Oct. 31, 2011". Jun. 30, 2011, Aug. 26, 2011, and Oct. 31, 2011. 3 pages.
Annex D1F to opposition by opponent Ensinger GmbH. "Expert Opinion on "Thermobar" Spacer". Jan. 18, 2017. 14 pages. (English Translation + German Original).

(56) References Cited

OTHER PUBLICATIONS

Annex D2 to opposition by opponent Ensinger GmbH. "DIN EN ISO 10077-1 in the version dated May 2010". May 2010. 48 pages. (English Translation + German Original).
Annex D7 to opposition by opponent Ensinger GmbH. "Avis Technique [Technical Evaluation] 6/04-1562 regarding the Super Spacer Premium and the Super Spacer Premium Plus the Edgetech Europe GmbH". Jan. 4, 2005. 46 pages. (English Translation + German Original).
Opposition by opponent Helima GmbH in European Patent 2,802,726 B1, issued Apr. 27, 2016 to Saint-Gobain Glass France. Mail date: Jan. 27, 2017. 159 pages. (English Translation + German Original).
Supplement to opposition by opponent Helima GmbH in European Patent 2,802,726 B1, issued Apr. 27, 2016 to Saint-Gobain Glass France. Mail date: Mar. 23, 2017. 6 pages. (English Translation + German Original).
Annex A1 to opposition by opponent Helima GmbH. "Excerpt from the website of the company Viking regarding Window DK88". Sep. 2012. 4 pages.
Annex A2 to opposition by opponent Helima GmbH. "Excerpt from the Polish website of the patent holder". Nov. 12, 2012. 3 pages. (English Translation + German Original).
Annex A3 to opposition by opponent Helima GmbH. "Technical Opinion 6/13-2124*01 Add of the CSTB". Sep. 24, 2014. 60 pages. (English Translation + French Original).
Annex A4 to opposition by opponent Helima GmbH. "Technical Opinion 06/16-2303 of the CSTB". Jun. 30, 2016. 62 pages. (English Translation + French Original).
Annex A5 to opposition by opponent Helima GmbH. "Datasheet Swisspacer Ultimate". Apr. 2013. 2 pages. (English Translation + German Original).
Annex A6 to opposition by opponent Helima GmbH. "Excerpt from AIMCAL "Metallizing Technical Reference"". May 2012. 2 pages.
Annex A7 to opposition by opponent Helima GmbH. "Excerpt from Frick/Knoll: Baukonstruktionslehre [Structural Design Theory] 2, Ed.34". Hestermann and Rongen, "Frick/Knöll Baukonstruktionslehre 2", pp. 371-372, 2013. 4 pages. (German Original Only).
Annex A8 to opposition by opponent Helima GmbH. "Affidavit". Jan. 27, 2017. 2 pages.
Annex A9 to opposition by opponent Helima GmbH. "Datasheet Sanco ACS Thermix". Jun. 2009. 5 pages. (English Translation + German Original).
Annex A10 to opposition by opponent Helima GmbH. "Barrier films for vacuum insulation panels (VIP)". Kaczmarek, "Barrier films for vacuum insulation panels (VIP)", $7_{th}$ International Vacuum Insulation Symposium 2005, pp. 91-98, 2005. 8 pages.
Opposition by opponent Rolltech A/S in European Patent 2,802,726 B1, issued Apr. 27, 2016 to Saint-Gobain Glass France. Mail date: Jan. 27, 2017. 32 pages.
Annex O1i to opposition by opponent Rolltech A/S. "Ceramis Barrier Films by Alcan Packaging". Mar. 2005. 4 pages.
Annex O1ii to opposition by opponent Rolltech A/S. "'Barrier Films: SiOx Barrier Benefits' by Marius Breune in Paper, Film & Foil Converter". Oct. 1, 2010. 4 pages.
Opposition by opponent Technoform Glass Insulation Holding GmbH in European Patent 2,802,726 B1, issued Apr. 27, 2016 to Saint-Gobain Glass France. Mail Date: Jan. 26, 2017. 55 pages. (English Translation + German Original).
Annex E6a to opposition by opponent Technoform Glass Insulation Holding GmbH. "ISO 10077-1 in the version of 2006". Sep. 15, 2006. 42 pages.
Annex E6b to opposition by opponent Technoform Glass Insulation Holding GmbH. "ISO 10077-2 in the version of 2012". Mar. 1, 2012. 44 pages.
Annex E6c to opposition by opponent Technoform Glass Insulation Holding GmbH. "two data sheets Saint-Gobain Swisspacer from 2008". Oct. 2008. 2 pages.
Opposition by opponent Thermoseal Group Ltd in European Patent 2,802,726 B1, issued Apr. 27, 2016 to Saint-Gobain Glass France. Mail date: Jan. 27, 2017. 20 pages.
Annex A to opposition by opponent Thermoseal Group Ltd. "Press notes and articles from 2011". May-Sep. 2011. 4 pages.
Annex B to opposition by opponent Thermoseal Group Ltd. "Invoices and delivery notes from Thermoseal Group Ltd from Aug. 2011 to Dec. 2011". Aug.-Dec. 2011. 24 pages.
Annex BB to opposition by opponent Thermoseal Group Ltd. "Invoice and delivery note from Thermoseal Group Ltd of Aug. 2011". Aug. 2011. 2 pages.
Annex C1 to opposition by opponent Thermoseal Group Ltd. "Thermobar production sheets from Thermoseal Group Ltd of Dec. 22, 2011 and Dec. 23, 2011". Dec. 22 and 23, 2011. 2 pages.
Annex C2 to opposition by opponent Thermoseal Group Ltd. "Stock Control from Thermoseal Group Ltd from Jun. 8, 2011 to Dec. 22, 2011". Jun. 8, 2011-Dec. 22, 2011. 14 pages.
Response to notices of opposition against European Patent EP 2 802 726 B1 by the companies Technoform Glass Insulation Holding GmbH (O1), Ensinger GmbH (O2), Camvac Limited (O3), Thermoseal Group Limited (O4), Rolltech A/S (O5), Helima GmbH (O6). Mail Date: Aug. 22, 2017. 119 pages (English Translation + German Original).
M.W. Phaneuf, "Applications of focused ion beam microscopy to materials science specimens", Micron 30. Jan. 28, 1999. pp. 277-288. 12 pages.
Bishop et al., "Metallizing Technical Reference", AIMCAL, May 2012. Title and pp. 21-25. 6 pages.
Non-Final Office Action issued for U.S. Appl. No. 15/321,161, filed Dec. 21, 2016 in the name of Saint-Gobain Glass France, dated Mar. 20, 2018. 15 pages.
Non-Final Office Action issued for U.S. Appl. No. 14/942,902, filed Nov. 16, 2015 in the name of Saint-Gobain Glass France, dated Jan. 3, 2018. 20 pages.
Non-Final Office Action issued for U.S. Appl. No. 15/038,356, filed May 20, 2016 in the name of Saint-Gobain Glass France, dated Feb. 22, 2018. 24 pages.
Non-Final Office Action issued for U.S. Appl. No. 15/038,298, filed May 20, 2016 in the name of Saint-Gobain Glass France, dated Dec. 28, 2017. 15 pages.
Non-Final Office Action issued for U.S. Appl. No. 14/942,902, filed Nov. 16, 2015 in the name of Saint-Gobain Glass France, dated Apr. 2, 2018. 21 pages.
Notice of Allowance issued for U.S. Appl. No. 15/038,298, filed May 20, 2016 in the name of Saint-Gobain Glass France, dated May 31, 2018. 12 pages.
Restriction Requirement issued for U.S. Appl. No. 15/038,356, filed May 20, 2016 in the name of Saint-Gobain Glass France, dated Jan. 16, 2018. 7 pages.
Written Opinion issued for International Patent Application PCT/EP2016/054226, filed Feb. 29, 2016 in the name of Saint-Gobain Glass France, dated May 3, 2016. 9 pages (English Translation + German Original).
Written Opinion issued for International Patent Application PCT/EP2014/076736, filed Dec. 5, 2014 in the name of Saint-Gobain Glass France, dated Mar. 10, 2016. 10 pages (English Translation + German Original).
Written Opinion issued for International Patent Application PCT/EP2014/076739, filed Dec. 5, 2014 in the name of Saint-Gobain Glass France, dated Feb. 3, 2015. 14 pages (English Translation + German Original).
Reply by opponent Rolltech A/S in European Patent 2,802,726 B1, issued Apr. 27, 2016 to Saint-Gobain Glass France. Mail date: Feb. 1, 2018. 8 pages.
Exhibit S27c to reply by opponent Rolltech A/S in European Patent 2,802,726 B1, issued Apr. 27, 2016 to Saint-Gobain Glass France. Sep. 12, 2017. 2 pages.
Exhibit S27d to reply by opponent Rolltech A/S in European Patent 2,802,726 B1, issued Apr. 27, 2016 to Saint-Gobain Glass France. Oct. 2010. 6 pages.
Reply by opponent Technoform Glass Insulation Holding GmbH in European Patent 2,802,726 B1, issued Apr. 27, 2016 to Saint-Gobain Glass France. Mail Date: Apr. 20, 2018. 15 pages. (English Translation + German Original).
Response by patentee Saint-Gobain Glass France to opponent's reply papers in European Patent 2,802,726 B1, issued Apr. 27, 2016

(56) References Cited

OTHER PUBLICATIONS to Saint-Gobain Glass France. Mail date: Jun. 18, 2018. 32 pages (English Translation + German Original).
EPO Preliminary Opinion for European Patent Application No. 12806056.3 filed Jun. 11, 2014 on behalf of Saint-Gobain Glass France, dated Jul. 23, 2018. 34 pages (English Translation + German Original).
Non-Final Office Action for U.S. Appl. No. 15/506,229, filed Feb. 23, 2017, on behalf of Saint-Gobain Glass France, dated Dec. 20, 2018. 24 pages.
Annex A7 to Opposition by Opponent Helima GmbH, Excerpt from Frick/Knoll: Baukonstruktionslehre [Structural Design Theory] 2, Ed.34, Hestermann and Rongen, Frick/Knoll Baukonstruktionslehre 2, 2013, 10 pages (English Translation+ German Original).
Annex D1C to Opposition by Opponent Ensinger GmbH Test Report AP 16-11-98, Nov. 2016, 16 pages (English Translation +German Original).
Delstar Technologies online catalog, Delstar catalogs Delnet as a Nets/Mesh/Apertured Film Downloaded from the internet on Feb. 14, 2017, (http://extrudedfilmsandnets.co.uk/products/product-types/nets-meshapertured- film), 1 page.
Delstar Technologies online catalog, Delstar catalogs Delnet as a Search/Category-all/Net Downloaded from the Internet on Feb. 14, 2017, (http://extrudedfilmsandnets.co.uk/products/finder/search/category-all/net), 1 page.
Final Office Action for U.S. Appl. No. 14/942,902, filed Nov. 16, 2015, on behalf of Saint-Gobain Glass France, dated Sep. 14, 2018. 21 pgs.
International Preliminary Report on Patentability Chapter I for Application No. PCT/EP2014/067901, dated Apr. 5, 2016, 15 pages (English Translation + German Original).
International Preliminary Report on Patentability Chapter I for Application No. PCT/EP2014/076736, dated Jun. 14, 2016, 12 pages (English Translation + German Original).
International Preliminary Report on Patentability Chapter I for Application No. PCT/EP2014/076739, dated Jun. 14, 2016, 16 pages (English Translation + German Original).
International Search Report for International Application No. PCT/EP2014/053714 filed Feb. 26, 2014 on behalf of Saint-Gobain Glass France, dated Mar. 25, 2014. 7 pages (German original + English Translation).
International Search Report for International Application No. PCT/EP2014/054710 filed Mar. 11, 2014 on behalf of Saint-Gobain Glass France, dated Apr. 4, 2014. 5 pages (German original + English Translation).
International Search Report for International Application No, PCT/EP2015/071452 filed Sep. 18, 2015 on behalf of Saint-Gobain Glass France, dated Dec. 2, 2015. 7 pages (English Translation + German Original).
Notice of Allowance for U.S. Appl. No. 15/038,298, filed May 20, 2016, on behalf of Saint-Gobain Glass France, dated Oct. 9, 2018. 14 pgs.
Notice of Allowance for U.S. Appl. No. 15/038,356, filed May 20, 2016, on behalf of Saint-Gobain Glass France, dated Oct. 15, 2018. 8 pgs.
Opposition by Opponent Helima GMBH in European Patent Application No. 2802726 B1, Mail date: Nov. 24, 2017, 14 pages (German Original+ English translation).
Restriction Requirement for U.S. Appl. No. 15/321,161, filed Dec. 21, 2016, on behalf of Saint-Gobain Glass France, dated Oct. 3, 2018. 7 pgs.
Restriction Requirement for U.S. Appl. No. 15/506,229, filed Feb. 23, 2017 on behalf of Saint-Gobain Glass France, dated Aug. 23, 2018. 6 pages.
Sua Sponte Withdrawal for U.S. Appl. No. 14/942,902, Mail Date: Feb. 2, 2018, 2 pages.
Written Opinion for Application No. PCT/EP2014/053714 filed Feb. 26, 2014 on behalf of Saint-Gobain Glass France, dated Mar. 25, 2014. 10 pages (German original+ English Translation).
Written Opinion for Application No. PCT/EP2014/054710 filed Mar. 11, 2014 on behalf of Saint-Gobain Glass France, dated Apr. 4, 2014. 12 pages (German original+ English Translation).
Written Opinion for International Application No. PCT/EP2015/071452 filed Sep. 18, 2015 on behalf of Saint-Gobain Glass France, dated Dec. 2, 2015. 11 pages. (English Translation + German Original).
Zimmermann M., 7th International Vacuum Insulation Symposium 2005, Table of Contents, Sep. 2005, 4 pages.

\* cited by examiner

INSULATED GLAZING COMPRISING A SPACER, AND PRODUCTION METHOD

CROSS REFERENCE TO RELATED APPLICATIONS

The present application is the U.S. national stage entry of International Patent Application No. PCT/EP2015/063821, filed internationally on Jun. 19, 2015, which, in turn, claims priority to European Patent Application No. 14174733.7, filed on Jun. 27, 2014.

The invention relates to an insulating glazing unit with a spacer comprising a plastic profile, a method for its production, and its use.

The construction of insulating glazing units consisting of two or more panes is known. Insulating glazing units are manufactured from at least two panes that are connected to one another via at least one circumferential spacer. Depending on the embodiment, the space between the two panes, referred to as the "glazing interior", is filled with air or gas, but in any case free of moisture. An excessive moisture content in the glazing interior results, in particular in the case of cold external temperatures, in the condensation of drops of water in the glazing interior, which absolutely must be avoided. To absorb the residual moisture remaining in the system after assembly, spacers that contain a desiccant can, for example, be used. However, since the absorption capacity of the desiccant is limited, even in this case, the sealing of the system is of enormous importance to prevent the penetration of further moisture. In the case of gas-filled insulating glazing units into whose glazing interior an argon filling, for example, is introduced, gas tightness must also be ensured. One or a plurality of layers of a sealing means and, if need be, film prevent gas and moisture exchange between the pane interspace and the environment as well as contributing to the mechanical stability of the insulating glass element.

Spacers made of different materials are known. Spacers made of materials with high thermal conductivity, for example, aluminum, have the disadvantage that they result in severe cooling of the pane edge in the case of low external temperatures, which degrades the thermal insulation and can result in the formation of condensation water on the pane on the building-interior side.

Spacers made of materials with lower thermal conductivity are consequently preferred (so-called "warm edge" systems). Spacers made of polymeric materials have these improved thermal insulating properties.

Spacers made of dimensionally stable plastics that contain desiccants in cavities or recesses or a desiccant-filled matrix are known, for example. Often, these multicomponent spacers must be assembled in a plurality of individual process steps, which makes production costly. One approach for minimizing the production steps is to coextrude the individual components.

Insulating glazing units that contain more than two panes are usually separated from one another by a plurality of individual spacers. For a triple glazing unit, another pane is placed on a double glazing by means of an additional spacer. In the assembly of such a multi-glazing unit, very low tolerance specifications apply since all spacers must be mounted at exactly the same height. Consequently, the assembly of multiple glazing units having more than two panes is more complicated in comparison with double glazing units because either additional system components are required for the installation of another pane or time-consuming multi-pass operation of a conventional system is necessary.

The use of thermoplastic materials for producing spacers that are produced either as a prefabricated profile and subsequently fixed between the panes or extruded directly onto the pane is known. In the first case, the pane contact surfaces of the spacer must be provided with an adhesive in a separate production step. The material properties must be precisely coordinated with one another to prevent detachment of the spacer from the pane.

Injectable thermoplastic spacers made of sealing materials such as polyisobutylene and butyl rubber are known that contain desiccants in the matrix such that a step for filling hollow bodies in dimensionally stable spacers is omitted. For producing insulating glazing units with more than two panes, these can be injected simultaneously on two sides of a center pane in the same height such that the stringent requirements for the assembly of triple insulating glazing units are met. These injectable thermoplastic spacers are darkly colored, have a rough surface, and are, consequently, not very attractive visually, and inscribing them for the purpose of pane labeling is difficult. During production of the injectable spacers, inaccuracies can occur that result in unevenness on the pane contact surface. This unevenness results, in the insulating glazing unit, in tensions and, ultimately, to failure of the leakproof bond between the pane and the spacer.

DE 696 07 473 discloses a double glazing unit with a composite spacer made of an insulating foam member, a sealing material, and a desiccant matrix that can advantageously be coextruded simultaneously. Use on a triple glazing unit poses the problem of positioning all spacers between the individual panes at precisely the same height. In addition, the assembly of the triple glazing unit must be done in stages.

DE 25 55 384 C3 discloses an intermediate layer made of a plastic material with an integrated desiccant, wherein the intermediate layer contains desiccant over its entire cross-section. The intermediate layer accordingly serves as spacer and sealing means, a situation which can, over time, result in the fact that the layer detaches and migrates into the visible region of the pane interspace (so-called "garland effect").

EP 2 420 536 A1 discloses a sealing compound consisting of a primary sealant containing a butyl sealant and a secondary sealant, wherein the primary sealant contains a polymer modified with specific reactive groups and the secondary sealant is a silicone-based sealant. This spacer is, like the injectable spacers described, darkly colored and, consequently, not very attractive visually.

The object of the present invention is to provide an insulating glazing unit that does not have the disadvantages mentioned and can be produced economically and cost-effectively.

The object of the present invention is accomplished according to the invention by an insulating glazing unit according to the various embodiments described in the present disclosure.

The insulating glazing unit according to the invention comprises at least a first pane, a second pane, a third pane arranged between the first pane and the second pane, an inner pane interspace, an outer pane interspace, and a spacer. The spacer comprises at least a first glazing interior surface, a second glazing interior surface, a first pane contact surface, and a second pane contact surface, at least a plastic profile, a primary sealing means, and a main member containing at least a sealing material containing a drying material. The plastic profile is arranged on the glazing interior surface and separates the outer pane interspace from the inner pane interspace and defines the distance between the adjacent panes. The plastic profile includes a groove to accommodate a third pane. The groove runs parallel to the first pane contact surface and the second pane contact surface and can protrude into the main member. The groove can have various geometries, for example, it can be implemented rectangular or trapezoidal. The third pane is inserted into the groove and is fixed such that no adhesive bonding of the pane is required. One advantage of the one-piece design of the plastic profile is that the glazing interior surfaces are automatically at the same height without necessitating special precautions during assembly. The plastic profile can be designed visually attractive and can, for example, be inscribed for the purpose of product labeling. The main member made of sealing material with a desiccant is arranged in the outer pane interspace adjacent the plastic profile. The sealing material has good gluing and adhesion properties on glass. For one thing, the main member bonds the glass panes and durably fixes the plastic profile in position, and, for another, includes the desiccant for bonding any moisture present in the inner pane interspace. The primary sealing means that seals the glazing interior enclosed by the circumferential spacer and the panes against gas exchange and penetration of moisture is arranged adjacent the main member in the outer pane interspace.

Thus, through the invention, an insulating glazing unit is provided that can be designed visually attractively by means of the plastic profile and with which the migration of the sealing material arranged between the outer panes into the glazing interior (garland effect) is prevented by the plastic profile.

The first pane contact surface and the second pane contact surface are the sides of the spacer on which, during the installation of the spacer, the mounting of the outer panes (first pane and second pane) of an insulating glazing unit is done. The first pane contact surface and the second pane contact surface run parallel to one another.

The glazing interior surfaces are defined as the surfaces of the polymeric main member which, after installation of the spacer in an insulating glazing unit, face toward the interior of the glazing unit. The first glazing interior surface is situated between the first and the second pane, whereas the second glazing interior surface is arranged between the third and the second pane.

In a preferred embodiment, the groove is wider than the pane mounted therein such that, additionally, an insert can be inserted into the groove, which prevents slippage of the pane and a development of noise caused thereby during opening and closing of the window. The insert further compensates the thermal expansion of the third pane when heated, such that, independent of the climatic conditions, a tension free fixation is ensured. The use of an insert is also advantageous with regard to minimization of the number of variants of the plastic profile. In order to keep the number of variants as small as possible and to nevertheless enable a variable thickness of the center pane, a plastic profile can be used with different inserts. The insert can also be formed directly on the polymeric main member, for example, in that both components are manufactured together in a two-component injection molding process.

The insert preferably includes an elastomer, particularly preferably ethylene propylene diene rubber and/or a thermoplastic polyurethane. Very good results are achieved with these materials.

The insert preferably includes a silicone and/or a polysulfide. These materials can be processed particularly easily and can be injected into the groove.

In a preferred embodiment, the primary sealing means is arranged in the outer pane interspace adjacent the main member and the pane contact surfaces. In this arrangement, the main member is surrounded on three sides by a primary sealing means and bordered at the inner pane interspace by the plastic profile. The primary sealing means has better adhesive properties than the material of the main member, which also contains, in addition to sealing material, desiccant. By means of the arrangement of the primary sealing means additionally on the pane contact surfaces, the leakproofness and stability of the arrangement are improved.

In a preferred embodiment, the main member and the primary sealing means are implemented in one piece, preferably coextruded. By means of the coextrusion, a particularly strong bond between the individual components is created without the use of additional adhesive.

In a preferred embodiment, the plastic profile includes, on the glazing interior surface, at least one opening, preferably a plurality of openings that enable the gas and moisture exchange between the main member and the glazing interior. Thus, the absorption of moisture by the desiccant that is included in the main member is permitted.

In a preferred embodiment, a secondary sealing means, which fills the pane interspace in its entire width between the first pane and the second pane, is introduced in the outer pane interspace adjacent the primary sealing means. This secondary sealing means effects adhesive bonding of the first and the second pane and thus ensures sufficient mechanical stability of the insulating glazing unit. The secondary sealing means preferably contains polysulfides, silicones, silicone rubber, polyurethanes, polyacrylates, copolymers, and/or mixtures thereof. Such materials have very good adhesion on glass such that the secondary sealing means serves primarily for adhesive bonding of the panes and contributes to the mechanical stability of the insulating glazing unit.

The main member includes a sealing material, preferably butyl rubber, polyisobutylene, or a hot-melt adhesive and includes a desiccant, which preferably contains silica gels, molecular sieves, $CaCl_2$, $Na_2SO_4$, activated carbon, silicates, bentonites, zeolites, and/or mixtures thereof.

The primary sealing means and the main member preferably contain the same sealing material, with the main member additionally containing desiccant. By this means, material incompatibilities on the interface between the primary sealing means and the main member are prevented.

The plastic profile preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. The plastic profile can, optionally, also include other components, for example, glass fibers.

The primary sealing means preferably contains butyl rubber, polyisobutylene, polyolefin rubber, copolymers, and/or mixtures.

The plastic profile preferably includes more than one groove such that insulating glazing units with more than three panes can also be produced. Insulating glazing units with more than three panes have better thermal insulation capacity than double or triple insulating glazing units.

The groove preferably has a depth of 1 mm to 15 mm, particularly preferably of 2 mm to 4 mm. By this means, a stable fixation of the third pane can be achieved.

The wall thickness d of the plastic profile is 0.5 mm to 15 mm, preferably 0.5 mm to 10 mm, particularly preferably 0.7 mm to 1 mm. By this means, a stable fixation of the distance between the individual panes is achieved and efficient stabilization of the main member for preventing the garland effect is obtained.

The pane interspace of the insulating glazing unit is preferably filled with a protective gas, preferably with a noble gas, preferably argon or krypton, which reduce the heat transfer value in the pane interspace.

The first pane and/or the second and/or the third pane contain glass and/or polymers, preferably quartz glass, borosilicate glass, soda lime glass, polymethyl methacrylate, and/or mixtures thereof. Other panes beyond the third pane also include these materials.

The panes have a thickness of 1 mm to 50 mm, preferably 3 mm to 16 mm, particularly preferably 3 mm to 10 mm, with the panes even possibly having different thicknesses. A variation of the thicknesses of the panes improves the soundproofing (asymmetric structure).

The individual panes can be simple glass panes or composite glass panes that contain, for example, special soundproofing films in order to also obtain a sound insulation effect in addition to a thermal insulation effect. To improve the thermal insulation, so-called low-E coatings can also be used, which offer an effective possibility of shielding infrared radiation against entry into the living area and simultaneously allowing passage of daylight. Low-E coatings are thermal-radiation reflecting coatings that reflect a significant portion of the infrared radiation, which results, in the summer, in reduced heating of the living area. Many different low-E coatings are known, for example, from DE 10 2009 006 062 A1, WO 2007/101964 A1 EP 0 912 455 B1, DE 199 27 683 C1, EP 1 218 307 B1, and EP 1 917 222 B1. Such low-E coatings cannot be applied to the center pane of a triple glazing unit according to the prior art since the coating causes heating of the pane from sunlight, which results in a failure of the adhesive bond between the center pane and spacers. Also, adhesive bonding of the center pane with a functional coating produces additional tensions. For compensation of these tensions, the center pane according to the prior art must be prestressed. In contrast, the spacer according to the invention with a plastic profile including a groove enables the production of an insulating glazing unit with a low-E coating on the third pane without necessitating prestressing of the third pane. Thus, the prestressing process is omitted, by which means a further cost-reduction can be achieved. By means of the tension-free fixation in a groove according to the invention, the thickness and, thus, the weight of the third pane can also be advantageously reduced.

The invention further includes a method for producing an insulating glazing unit according to the invention comprising the steps:

Inserting a third pane in a groove of a plastic profile,
Inserting the plastic profile with a pre-mounted third pane between a first and a second pane,
Coextruding a main member comprising a sealing material with a desiccant and a primary sealing means on the plastic profile.

In a first embodiment of the method for producing an insulating glazing unit according to the invention, a third pane is first pre-mounted in a groove of the plastic profile. For pre-mounting a rectangular pane, the plastic profile can be preshaped into a rectangle open on one side. Three plastic profiles can, for example, be provided with a miter cut and welded to one another at the corners. In the plastic profiles arranged in a U-shape, the third pane is inserted into the groove of the plastic profile starting from the open side of the arrangement. The remaining open edge of the third pane is then also closed with a plastic profile. Alternatively, the profiles can also be clamped or plugged in on the pane edge if the groove is appropriately adapted to the pane thickness. Thus, panes with different geometries can be readily processed. After the assembly of the complete plastic profile around the third pane, the plastic profile is inserted between between a first pane and a second pane. The plastic profile can, for example, be provided with an adhesive on the sides that are intended to abut the pane and, thus, be fixed. In a further process step, the main member and the primary sealing means are coextruded around the plastic profile directly in the outer pane interspace. The extruded material cures and a durably stable adhesive bond is created.

In a second alternative embodiment of the method according to the invention, a third pane is first inserted into the groove of the plastic profile and then the plastic profile is provided with the main member and a primary sealing means, which are coextruded directly onto the plastic profile. The processing of the pre-mounted component can be done in a conventional double glazing system known to the person skilled in the art. The costly installation of additional system components or a loss of time through multiple passes through a system, as in the case of the installation of multiple individual spacers according to the prior art, can thus be avoided. This is advantageous in terms of increased productivity and cost reduction. For this, the first pane and the second pane are mounted on the two pane contact surfaces of the spacer composed of a plastic profile, a main member, and a primary sealing means, and, in the last step, the arrangement is pressed, by which means a stable adhesive bond is created. Preferably, in this method, the primary sealing means is also mounted on the pane contact surfaces, which improves the adhesion to the first and second pane.

Preferably, the inner pane interspace between the first pane and the third pane as well as between the second pane and the third pane is filled with a protective gas.

The invention further includes the use of an insulating glazing unit according to the invention as building interior glazing, building exterior glazing, and/or façade glazing.

In the following, the invention is explained in detail with reference to drawings. The drawings are purely schematic representations and not true to scale. They in no way restrict the invention.

Figure 1B:
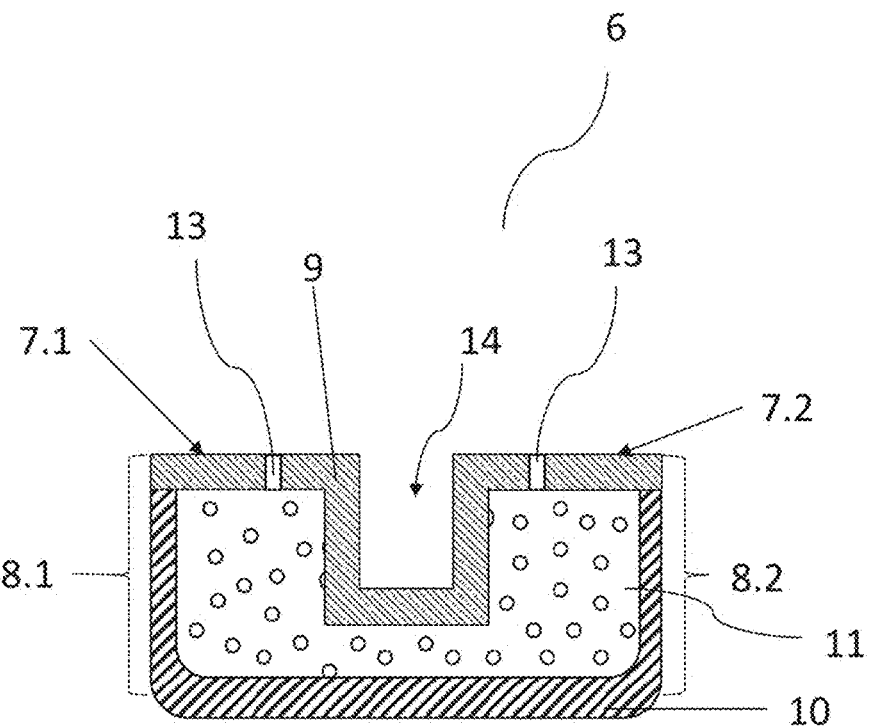
Figure 1C:
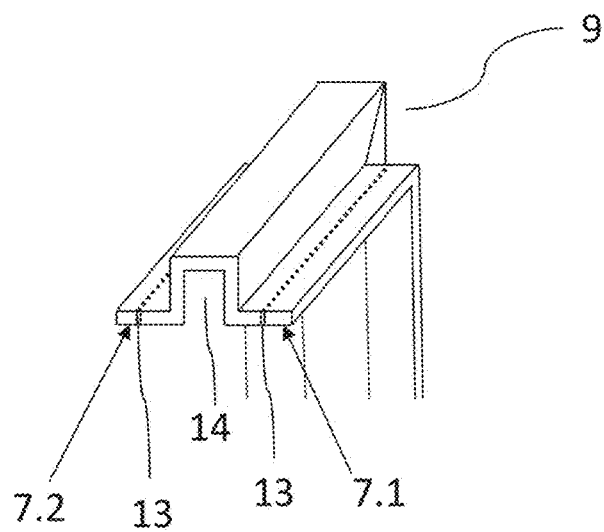
Figure 2:
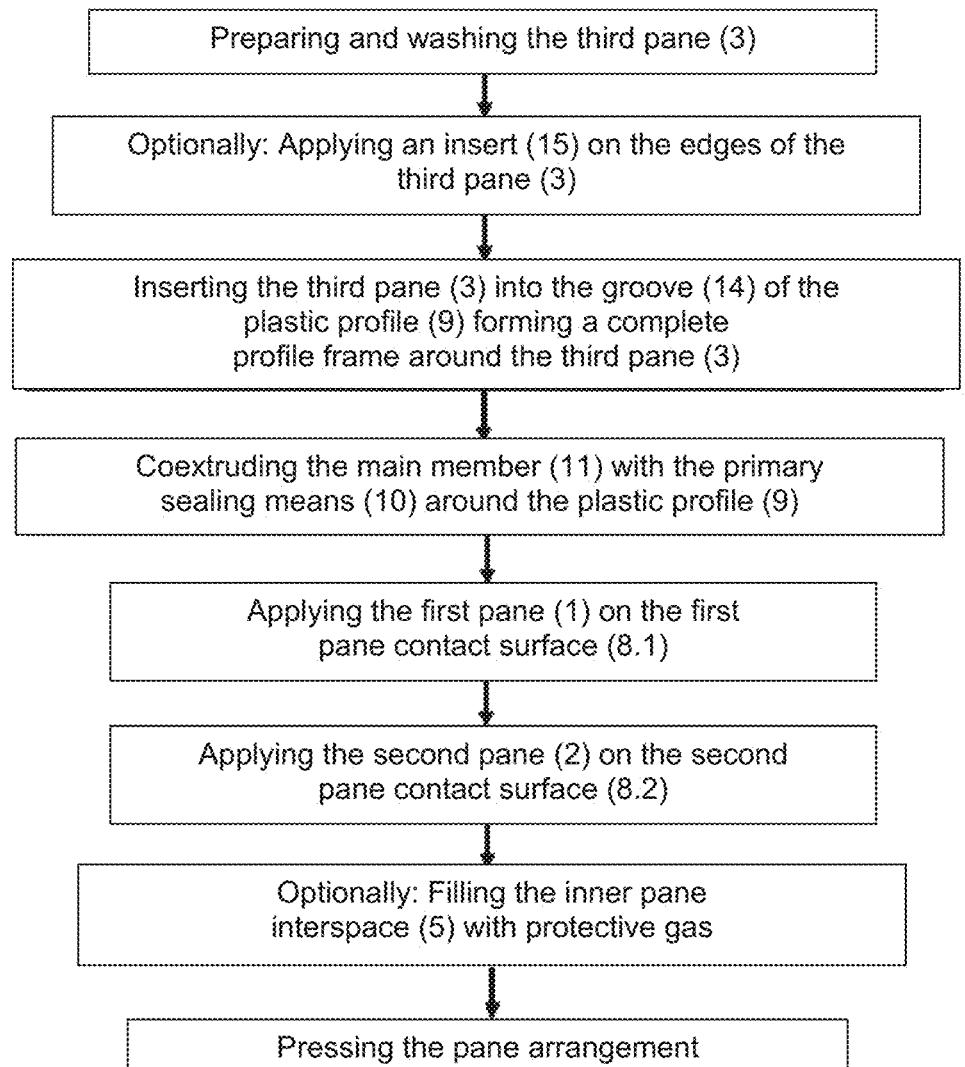
Figure 3:
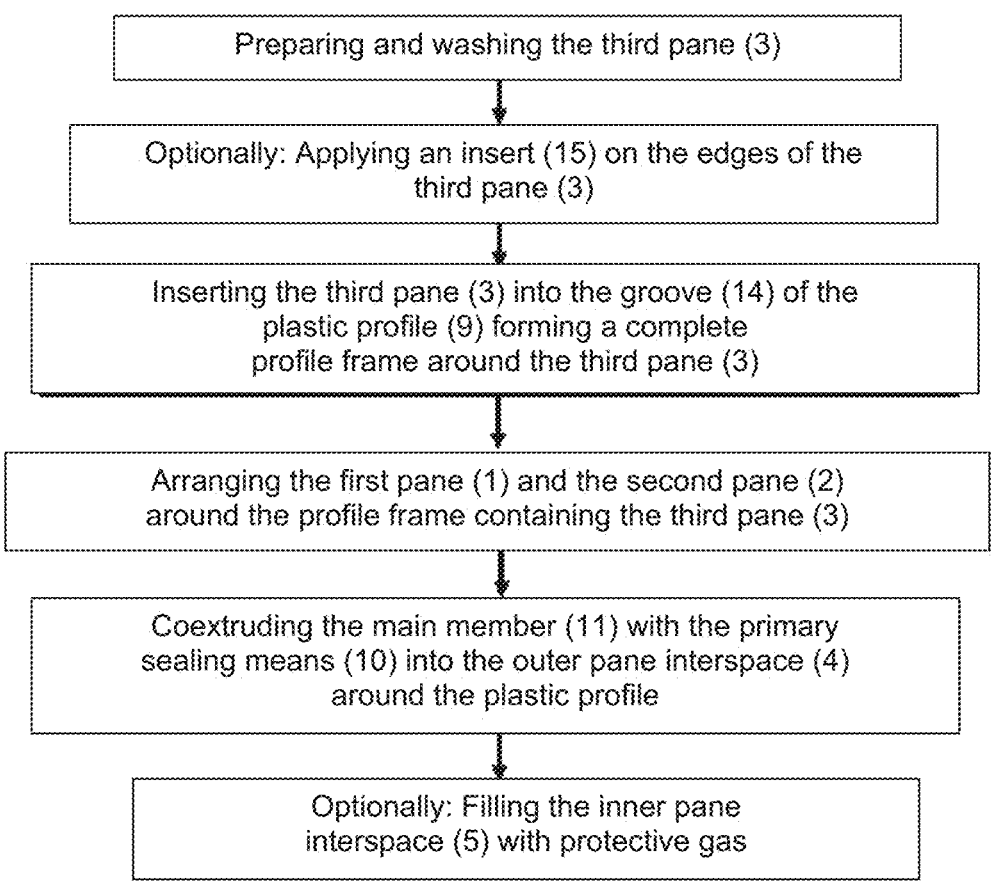

They depict:

FIGS. 1a, 1b, and 1c: a schematic representation of the insulating glazing unit according to the invention, FIG. 2: a flowchart of a possible embodiment of the method according to the invention, and FIG. 3: a flowchart of a possible embodiment of the method according to the invention.

FIGS. 1a, 1b, and 1c depict a schematic representation of the insulating glazing unit according to the invention. Between a first pane 1 and a second pane 2, a third pane 3 is arranged. Between the first pane 1 and the second pane 2, a spacer 6 is mounted, which spacer is made up of a plastic profile 9, a main member 11 containing a sealing material and a desiccant and a primary sealing means 10. The plastic profile 9 separates the inner pane interspace 5 from the outer pane interspace 4. The plastic profile 9 includes a groove 14 to accommodate the third pane 3. The groove 14 runs parallel to the pane contact surfaces 8.1 and 8.2 and protrudes into the main member 11. The third pane 3 is inserted into the groove 14 via an insert. The insert 15 surrounds the edge of the third pane 3 and fits flush in the groove 14. The insert 15 is made of ethylene propylene diene rubber. The insert 15 fixes the third pane 3 without tension and compensates thermal expansion of the pane. Moreover, the insert 15 prevents development of noise resulting from slippage of the third pane 3. The plastic profile 9 can, during the course of the production process, be assembled to form a complete frame around the third pane 3. The plastic profile 9 has openings 13 on the glazing interior surfaces 7.1 and 7.2, in order to produce a connection between the inner pane interspace 5 and the main member 11, to enable gas exchange and to permit absorption of moisture by the desiccant. In the outer pane interspace 4, a primary sealing means 10 that can contain the same sealing material as the main member 11 is mounted adjacent the main member 11. The first pane contact surface 8.1 and the second pane contact surface 8.2 are formed by the plastic profile 9 and the primary sealing means 10. Compared with an arrangement in which the pane contact surfaces 8.1 and 8.2 are also formed by the main member 11, the adhesive bonding and the sealing are improved since the primary sealing means 10 has better adhesion properties than the sealing means with a desiccant. A secondary sealing means 12 is mounted adjacent the primary sealing means 10 in the outer pane interspace 4 between the first pane 1 and the second pane 2, which serves for the adhesive bonding of the two panes 1 and 2 and which increases the mechanical stability of the insulating glazing unit.

FIG. 2 depicts a flowchart of a possible embodiment of the method according to the invention. First, a third pane 3 is prepared and washed. Optionally, an insert 15 is applied on the edges of the third pane 3. The third pane 3 is then inserted into the groove 14 of the plastic profile 9. Thus, a complete profile frame is formed around the third pane 3. This can be done by mounting four plastic profiles on the edges of the pane, or three plastic profiles can be preshaped to form a rectangle open on one side, with the third pane 3 being inserted into the groove 14 via the open side. The corners can, if need be, be linked by corner connectors or welded. The thus pre-mounted pane can then be further processed in a conventional double glazing system. There, the mounting of the first pane 1 and the second pane 2 on the pane contact surfaces 8.1 and 8.2 is done. Optionally, a protective gas can be introduced into the inner pane interspace 5. In a last step, the insulating glazing unit is pressed.

FIG. 3 depicts a flowchart of a possible embodiment of the method according to the invention. First, a third pane 3 is prepared and washed. Optionally, an insert 15 is applied on the edges of the third pane 3. The third pane 3 is then inserted into the groove 14 of the plastic profile 9. Thus, a complete profile frame is formed around the third pane 3. The plastic profile 9 with the pre-mounted third pane 3 is arranged between the first pane 1 and the second pane 2. Here, the plastic profile 9 can be provided on the sides with adhesive tape, in order to fix it between the panes 1 and 2 before the following process step. Then, the main member 11 with the primary sealing means 10 is extruded onto the plastic profile 9 in the outer pane interspace 4. Optionally, the inner pane interspace 5 can be filled with protective gas.

LIST OF REFERENCE CHARACTERS

1 first pane
2 second pane
3 third pane
4 outer pane interspace
5 inner pane interspace
6 spacer
7.1 first glazing interior surface
7.2 second glazing interior surface
8.1 first pane contact surface
8.2 second pane contact surface
9 plastic profile
10 primary sealing means
11 main member
12 secondary sealing means
13 openings
14 groove
15 insert

The invention claimed is:

1. An insulating glazing unit comprising:
   a first pane;
   a second pane;
   a third pane arranged between the first pane and the second pane;
   an outer pane interspace defined by a space between the first pane and the second pane bounded on one side by first edges of said panes;
   an inner pane interspace defined by a space between the first pane and the second pane bounded on one side by second edges of said panes opposite the first edges; and
   a spacer comprising:
      a plastic profile with a first glazing interior surface and a second glazing interior surface;
      a first pane contact surface;
      a second pane contact surface;
      a primary sealing means; and
      a main member containing at least one sealing material and at least one dry material,
   wherein:
      the plastic profile comprises a groove into which the third pane is inserted and which runs parallel to the first pane contact surface and to the second pane contact surface,
      the plastic profile separates the outer pane interspace from the inner pane interspace,
      the main member is arranged in the outer pane interspace between the plastic profile and the primary sealing means and adjacent the plastic profile and the primary sealing means,
      the first pane and the second pane each make direct contact with the plastic profile and the primary sealing means respectively at the first pane contact surface and the second pane contact surface, and
      the main member is contained within a space that is delimited by the primary sealing means and the plastic profile.

2. The insulating glazing unit according to claim 1, wherein the groove comprises an insert, preferably an insert containing an elastomer, particularly preferably containing ethylene propylene diene rubber and/or a thermoplastic polyurethane.

3. The insulating glazing unit according to claim 2, wherein the insert contains an elastomer.

4. The insulating glazing unit according to claim 3, wherein the insert contains ethylene propylene diene rubber and/or a thermoplastic polyurethane.

5. The insulating glazing unit according to claim 1, wherein the main member and the primary sealing means are formed in one piece.

6. The insulating glazing unit according to claim 5, wherein the main member and the primary sealing means are coextruded.

7. The insulating glazing unit according to claim 1, wherein the plastic profile comprises at least one opening to enable gas and moisture exchange between the main member and the inner pane interspace.

8. The insulating glazing unit according to claim 7, wherein the at least one opening comprises a plurality of openings.

9. The insulating glazing unit according to claim 1, wherein between the first pane and the second pane in the outer pane interspace, a secondary sealing means is arranged adjoining the primary sealing means, the secondary sealing means comprising a polymer or silane-modified polymer.

10. The insulating glazing unit according to claim 9, wherein the secondary sealing means comprises organic polysulfides, silicones, room-temperature vulcanizing silicone rubber, high-temperature vulcanizing silicone rubber, peroxide vulcanizing silicone rubber, and/or addition vulcanizing silicone rubber, polyurethanes, and/or butyl rubber.

11. The insulating glazing unit according to claim 1, wherein the main member contains at least one sealing material and a desiccant.

12. The insulating glazing unit according to claim 11, wherein the at least one sealing material contains a hot-melt adhesive, polyisobutylene, butyl rubber, and/or polybutene.

13. The insulating glazing unit according to claim 11, wherein the desiccant comprises silica gels, molecular sieves, $CaCl_2$, $Na_2SO_4$, activated carbon, silicates, bentonites, zeolites, and/or mixtures thereof.

14. The insulating glazing unit according to claim 1, wherein the primary sealing means and the main member contain the same sealing material and wherein the main member additionally contains desiccant.

15. The insulating glazing unit according to claim 1, wherein the plastic profile contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof and, and optionally, has a glass-fiber content.

16. The insulating glazing unit according to claim 1, wherein the primary sealing means contains butyl rubber, polyisobutylene, polyolefin rubber, copolymers, and/or mixtures thereof.

17. The insulating glazing unit according to claim 1, wherein the plastic profile comprises at least one second groove to accommodate a fourth pane.

18. A method for producing an insulating glazing unit, the method comprising:
providing a first pane, a second pane, and a third pane;
providing a spacer comprising:
a plastic profile with a first glazing interior surface and a second glazing interior surface;
a first pane contact surface; and
a second pane contact surface;
inserting the third pane into a groove of the plastic profile;
inserting the plastic profile with the pre-mounted third pane between the first pane and the second pane; and
coextruding a main member and a primary sealing means on the plastic profile in an outer pane interspace, thereby producing the insulating glazing unit that comprises:
the first pane;
the second pane;
the third pane arranged between the first pane and the second pane;
the outer pane interspace defined by a space between the first pane and the second pane bounded on one side by first edges of said panes;
an inner pane interspace defined by a space between the first pane and the second pane bounded on one side by second edges of said panes opposite the first edges; and
the spacer comprising:
the plastic profile with the first glazing interior surface and the second glazing interior surface;
the first pane contact surface;
the second pane contact surface;
the primary sealing means; and
the main member containing at least one sealing material and at least one dry material,
wherein:
the plastic profile comprises the groove into which the third pane is inserted and which runs parallel to the first pane contact surface and to the second pane contact surface,
the plastic profile separates the outer pane interspace from the inner pane interspace,
the main member is arranged in the outer pane interspace between the plastic profile and the primary sealing means and adjacent the plastic profile and the primary sealing means,
the first pane and the second pane each make direct contact with the plastic profile and the primary sealing means respectively at the first pane contact surface and the second pane contact surface, and
the main member is contained within a space that is delimited by the primary sealing means and the plastic profile.

19. A method for producing an insulating glazing unit, the method comprising:
providing a first pane, a second pane, and a third pane;
providing a spacer comprising:
a plastic profile with a first glazing interior surface and a second glazing interior surface;
a first pane contact surface; and
a second pane contact surface;
inserting the third pane into a groove of the plastic profile;
coextruding a main member and a primary sealing means on the plastic profile;
arranging the plastic profile with the pre-mounted third pane, the main member, and the primary sealing means between the first pane and the second pane, thereby obtaining a pane arrangement of the insulating glazing unit; and
pressing the pane arrangement, thereby producing a stable adhesive bond,
wherein the insulating glazing unit comprises:
the first pane;
the second pane;
the third pane arranged between the first pane and the second pane;
an outer pane interspace defined by a space between the first pane and the second pane bounded on one side by first edges of said panes;

an inner pane interspace defined by a space between the first pane and the second pane bounded on one side by second edges of said panes opposite the first edges; and the spacer comprising:
- the plastic profile with the first glazing interior surface and the second glazing interior surface;
- the first pane contact surface;
- the second pane contact surface;
- the primary sealing means; and
- the main member containing at least one sealing material and at least one dry material, wherein:
- the plastic profile comprises the groove into which the third pane is inserted and which runs parallel to the first pane contact surface and to the second pane contact surface,
- the plastic profile separates the outer pane interspace from the inner pane interspace,
- the main member is arranged in the outer pane interspace between the plastic profile and the primary sealing means and adjacent the plastic profile and the primary sealing means,
- the first pane and the second pane each make direct contact with the plastic profile and the primary sealing means respectively at the first pane contact surface and the second pane contact surface, and
- the main member is contained within a space that is delimited by the primary sealing means and the plastic profile.

20. The method according to claim 19, wherein before the pressing of the pane arrangement, the inner pane interspace is filled with protective gas.

21. A method, comprising:
- providing an insulating glazing unit according to claim 1; and
- using the insulating glazing unit as a building interior glazing, a building exterior glazing, and/or a façade glazing.

* * * * *